United States Patent [19]
Kaelin

[11] 4,021,349
[45] May 3, 1977

[54] APPARATUS FOR CIRCULATING AND/OR AERATING A LIQUID

[76] Inventor: Joseph Richard Kaelin, Seeburg, Buochs, Switzerland

[22] Filed: June 6, 1975

[21] Appl. No.: 584,396

[30] Foreign Application Priority Data
June 11, 1974 Switzerland .................. 7941/74

[52] U.S. Cl. .................. 210/219; 210/220; 261/91; 261/93
[51] Int. Cl.² .................. B01F 3/04
[58] Field of Search .......... 210/14, 15, 4, 7, 220, 210/221 R, 219, 197, 195, 205, 207, 208; 261/91, 87, 93

[56] References Cited
UNITED STATES PATENTS

| 3,796,417 | 3/1974 | Kaelin | 210/221 R |
|---|---|---|---|
| 3,814,395 | 6/1974 | Kaelin | 261/91 |
| 3,827,679 | 8/1974 | Kaelin | 210/15 |
| 3,846,516 | 11/1974 | Carlson | 261/91 |
| 3,852,384 | 12/1974 | Bearden | 261/77 |
| 3,865,721 | 2/1975 | Kaelin | 210/15 |

FOREIGN PATENTS OR APPLICATIONS
507,164  6/1971  Switzerland .................. 261/91

Primary Examiner—Frank A. Spear, Jr.
Assistant Examiner—Benoit Castel
Attorney, Agent, or Firm—Werner W. Kleeman

[57] ABSTRACT

An apparatus for circulating and/or aerating a liquid, especially waste water located in a tank or basin by means of a centrifugal impeller or rotor immersed in the liquid and rotatable about a substantially vertical axis. The centrifugal impeller is equipped with a multiplicity of at least approximately radially extending liquid conveying channels. The liquid conveying channels at least at the region of their outlet openings or mouths are curved in such a manner in a vertical plane and/or provided at the outlet openings in such a manner with flow deflection surfaces that the liquid emanating from the conveying channels flows at an angle of at least 5° relative to a substantially horizontal plane towards the side of the impeller provided with an inlet opening.

17 Claims, 6 Drawing Figures

APPARATUS FOR CIRCULATING AND/OR AERATING A LIQUID

BACKGROUND OF THE INVENTION

The present invention relates to a new and improved construction of apparatus for circulating and/or aerating a liquid, especially waste water located in a basin or tank, by means of a centrifugal impeller or rotor immersable in the liquid and rotatable about a substantially vertical axis, said centrifugal impeller being equipped with a multiplicity of at least approximately radially extending liquid conveying channels, and furthermore, this invention relates to the use of the aforesaid apparatus.

It is already known to the art to circulate waste water which is to be aerated by means of an impeller or rotor located below the level of the liquid located in an activation tank or activated-sludge basin. The impellers used for this purpose are generally all constructed in a manner such that the liquid conveyed through the impeller departs in horizontal direction at the periphery of the impeller. However, with regard to flow considerations this is quite unfavorable, since the liquid emanating from the liquid conveying channels should be guided upwardly or downwardly along the wall of the tank or vessel in order to realize the desired flow path. However, if the liquid emanating from the rotor flows in a horizontal direction perependicularly towards the wall of the tank or basin, there is not realized any exactly defined flow in the desired direction. However, if there are arranged flow deflection means at the basin wall, then such tend to become markedly coated with sludge and in the case of large tanks or basins result in a considerable increase in the construction cost.

SUMMARY OF THE INVENTION

Hence, with the foregoing in mind it is a primary object of the present invention to provide an improved apparatus for circulating and/or aerating a liquid in a manner not associated with the aforementioned drawbacks and limitations of the prior art proposals.

Another and more specific object of the present invention aims at the provision of a new and improved construction of apparatus for the circulation and/or aeration of a liquid which does not possess the previously mentioned drawbacks, and without any appreciable additional cost provides for the desired flow conditions in contrast to the heretofore known prior art impellers or rotors.

Now in order to implement these and still further objects of the invention, which will become more readily apparent as the description proceeds, the apparatus of this development is manifested by the features that the liquid conveying channels at least at the region of their outlet openings or mouths are curved in such a manner in a vertical plane and/or provided at the outlet openings in such a manner with flow deflection surfaces that the liquid flowing out of the conveying channels flows at an angle of at least 5° with respect to a substantially horizontal plane towards the side of the rotor equipped with the inlet opening.

Especially in the case of activated-sludge basins of water purification installations it is advantageous if the impeller or rotor is constructed as a double-side centrifugal pump impeller.

In order to be able to construct the mounting or bearing arrangement for the impeller or rotor drive shaft as simply as possible, it is advantageous if the impeller is constructed as a floating or buoyant body.

It is moreover advantageous if at least a part of the conveying channels which are formed between the individual buckets or blades are connected via connection conduits or lines with the gas volume located above the level of the liquid, with the ambient atmosphere and/or with a source of oxygen. In order to maintain the power requirements for operation of the installation as low as possible it is advantageous if the connection conduits open at the negative pressure region into the conveying channels.

In order to prevent rotation of the liquid located in the tank or basin at approximately the same rotational speed as the impeller after a certain start-up time and thereby markedly reduce the conveying capacity of the liquid, it is advantageous if there is arranged in front of the suction opening of the impeller a flow guiding device provided with flow guiding surfaces extending in the radial and axial directions.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
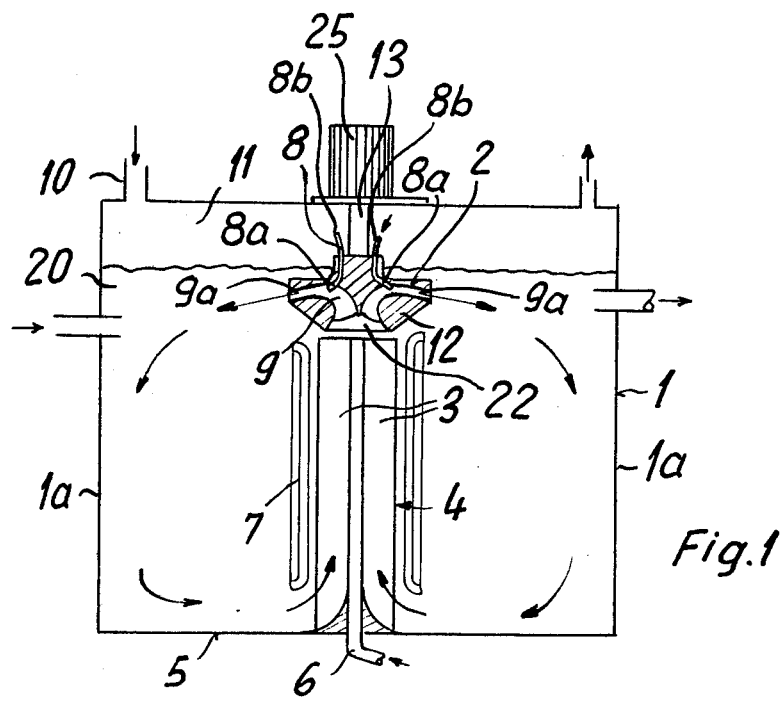
FIG. 1 schematically illustrates, partially in cross-sectional view, a first exemplary embodiment of apparatus designed according to the teachings of the present invention.

Describing now the drawings, in the exemplary embodiment depicted in FIG. 1 there is shown an apparatus for circulating and aerating waste water located in an aeration or activated-sludge basin or tank 1 by means of a centrifugal rotor or impeller 2 which immerses into the liquid, generally indicated by reference character 20, the centrifugal rotor or impeller 2 being rotatable about a substantially vertical axis.

In the description to follow the component 2 will be conveniently simply referred to as a "centrifugal impeller" or "impeller".

Beneath the suction opening 22 of the centrifugal impeller 2 there is arranged a flow guiding or guide device 4 provided with flow guide surfaces 3 extending in the radial and axial directions and situated crosswise with respect to one another. In this regard reference is made to FIGS. 3 and 4, by way of example. The flow guiding device or mechanism 4 ensures that the waste water to be aerated flows into the suction opening 22 of the impeller 2 substantially without any spin or twist. The waste water to be aerated, owing to the action of the centrifugal impeller 2 has imparted thereto a spin or twisting motion which should be of such a magnitude that no activated-sludge can deposit at the floor or bottom 5 of the tank or basin 1.

Due to the provision of the flow guiding device 4 there is markedly increased the conveying capacity of the surface-aeration impeller 2 in contrast to constructional embodiments which are devoid of any such flow guide surfaces 3, since the relative speed between the waste water flowing into the impeller 2 and the rotational movement of the impeller 2, viewed in the peripheral direction of such impeller, is considerably greater in contrast to the heretofore known prior art constructions.

In order to maintain the biological decomposition process continually in effect, biologically active-activated sludge received from a post clarification or purification tank is admixed with the waste water located in the activated-sludge or aeration tank or basin 1 by means of a return flow line or conduit 6 which extends to the suction region or suction opening 22 of the aeration impeller 2. In order to preserve clarity in illustration the post clarification tank or basin has been conveniently omitted from the showing of the drawing.

In order to enrich the waste water located in the activated-sludge tank 1 with oxygen or the like there are provided the infeed lines or conduits 8 which have one end 8a located up to the negative pressure region of the conveying or conveyor channels 9 of the impeller 2 and which conveying channels are curved in vertical planes, as best seen by referring to FIG. 1. The other or opposite end 8b of each such infeed or delivery conduit 8 extends up to the space or region 11 located above the liquid or waste water 20, and which space 11 is enriched with pure oxygen by means of the infeed or delivery conduit 10 or equivalent structure. Hence, with the impeller 2 placed into rotation the liquid guide channels 9 through which the waste water flows function in the manner of water jet pumps and automatically suck gas enriched with pure oxygen out of the space or area 11 into the liquid or waste water 20. The liquid or waste water conveying channels 9 are downwardly curved at the region of their outlet openings or mouths 9a in a vertical plane in such a manner that the liquid emanating from the conveying channels 9 flows downwardly at an angle of, for instance, 10° in relation to a substantially horizontal plane.

Since in this manner the liquid departing from the impeller 2 can be vertically downwardly deflected by the walls 1a of the activated-sludge tank or basin 1 practically free of surges, extremely favorable flow conditions prevail throughout the entire tank or basin 1 with a minimum power requirement for the impeller 2.

In order to be able to construct the mounting or bearing arrangement for the impeller 2 as simply as possible, this impeller 2 is foamed at its outside at the region 12, so that within the waste water there is exerted practically no weight upon its drive shaft 13. Drive shaft 13 is driven by any suitable drive motor 25 or equivalent structure.

Figure 2:
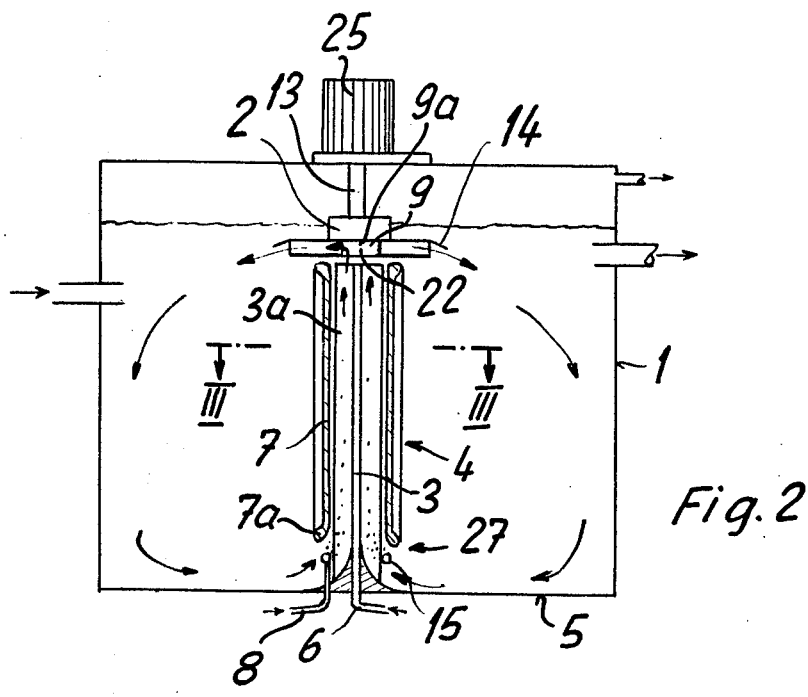
FIG. 2 schematically illustrates, again partly in cross-sectional view, a second exemplary embodiment of apparatus according to the invention.

With the embodiment of apparatus depicted in FIG. 2 there is employed a substantially disk-shaped impeller 2 possessing substantially horizontally extending waste water or liquid conveying channels 9. In order to nonetheless obtain a flow which is downwardly directed from the impeller 2, there are advantageously provided at the outlet mouths or openings 9a of the conveying channels 9 flow deflection surfaces or flow deflection means 14.

With this exemplary embodiment the flow guide surfaces 3 are surrounded by a tubular member or pipe 7 for the exact guiding of the waste to be aerated and delivered to the suction opening 22 of the surface aeration impeller 2. This tubular member or pipe 7 extends up to the lower portion or region 27 of the activated-sludge tank 1. In this way there is realized an extremely good, forced waste water circulation over the entire height of the tank or basin 1.

In order to obtain as uniform as possible inflow of the waste water into the suction opening 22 of the surface aeration impeller 2, the radial extent of the flow guide surfaces 3 is advantageously greater than the radius of the suction opening 22 of the impeller 2. Furthermore, it has been found that the effect of the flow guide device 4 can be improved if the outer edges 3a of the flow guide surfaces 3 are spaced in the radial direction from the tubular member or pipe 7, as best seen by referring to FIG. 2.

In order to facilitate the attachment of the tubular member 7 it is advantageous if the same is constructed such that its average or mean specific weight approximately corresponds to that of the waste water to be aerated; that is to say, the tubular member 7 can be fabricated of a suitable material or connected with material of lower specific weight (for example by being foamed with a foamable plastic).

At the lower end 7a of the tubular member 7 there is arranged an aeration ring 15 equipped with fine or small exit openings, the aeration ring 15 serving for the introduction or infeed of air, or air which has been enriched with oxygen, or pure oxygen, into the suction region 22 of the impeller 2. The aeration ring 15 is operatively connected via a conduit or line 8 with any suitable infeed source for such substances, this source having not been particularly shown inasmuch as the same is conventional and not needed for appreciating the underlying concepts of the invention.

Figures 3, 4, 5:
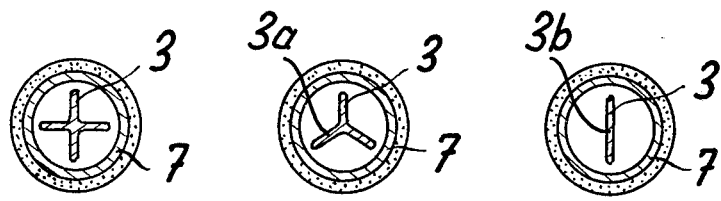
FIG. 3 is a cross-sectional view taken along the line III–III of FIG. 2.
FIG. 4 is a cross-sectional view analogous to the showing of FIG. 3.
FIG. 5 is a further cross-sectional view analogous to the showing of FIG. 3.

In FIG. 3 there is illustrated a cross-sectional view of the arrangement shown in FIG. 2 taken substantially along the line III—III thereof and which sectional view is through the flow guide device or mechanism 4. By referring to FIG. 3 there will be seen the cross-section of the flow guide surfaces 3. In FIGS. 4 and 5 there are illustrated analogous sectional views showing further exemplary cross-sectional configurations of the flow guide surfaces 3. In the arrangement of FIG. 4 the flow guide surfaces 3 are formed of three flow guide members 3a arranged in a substantially Y-shaped configuration. In the arrangement of FIG. 5 the flow guide surfaces 3 are in the form of a plate member 3b.

Figure 6:
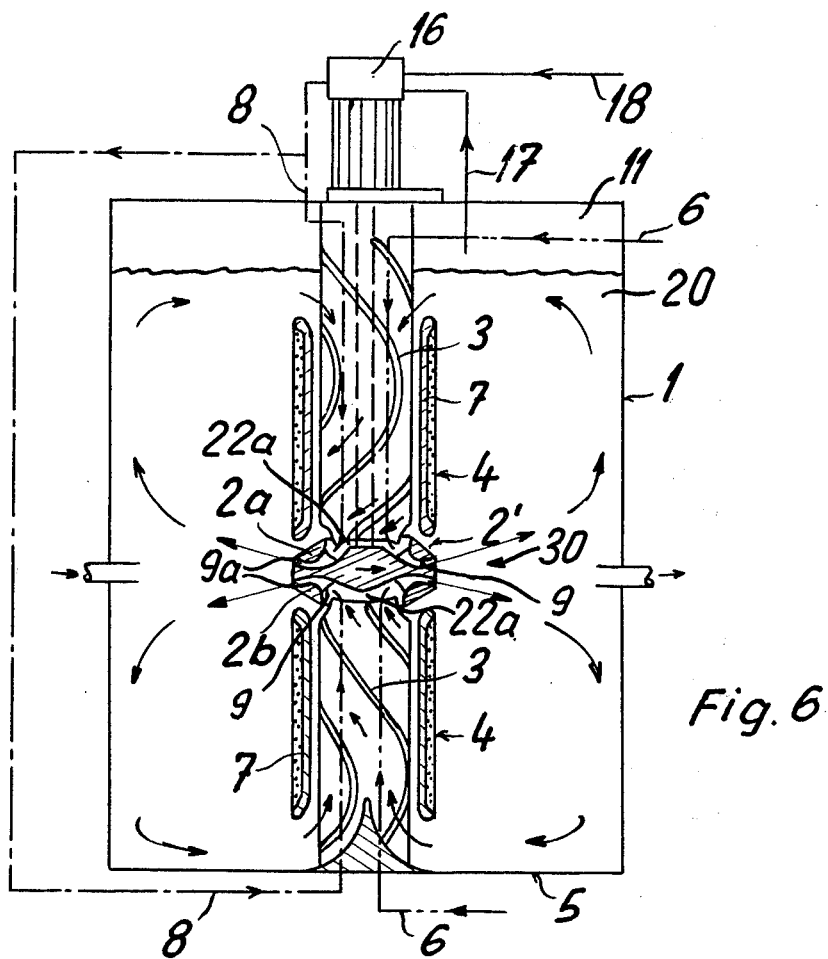
FIG. 6 schematically illustrates, partially in cross-sectional view, a third exemplary embodiment of apparatus designed according to the teachings of the present invention.

Continuing, the exemplary embodiment illustrated in FIG. 6 constitutes a double impeller or twin-impeller arrangement 2' which is arranged at the central region 30 of the activated-sludge tank or basin 1.

The oxygen or an oxygen mixture, such as for instance air or air enriched with oxygen, in this instance is delivered via the infeed lines or conduits 8 which open into the negative pressure regions of both impeller halves 2a and 2b, and owing to the action of the twin impeller 2' is intensively admixed with the waste water to be aerated.

In order to attain a charging or booster effect of the twin impeller or impeller means 2' the flow guide surfaces 3 of the flow guide device or mechanism 4, and which flow guide surfaces 3 extend in the radial and axial direction, are twisted in a screw-shaped or helical-line configuration along the lengthwise axis of the impeller, and specifically in such a manner that the waste water to be aerated flows into both suction openings 22a of the twin impeller 2' with a spin or twist which is opposite to the directions of rotation of such impeller.

The turning or twisting of the flow guide surfaces 3 is advantageously undertaken such that they gradually impart a twist to the waste water in a direction opposite to the twist of such waste water which enters at one end of the enclosing tubular member of pipe 7, in order to thus maintain the flow resisitance as low as possible.

Furthermore, by means of the infeed lines or conduits 6 which likewise open into the negative pressure regions of the twin impeller arrangement or twin impeller 2' it is possible to deliver activated-sludge from a post clarification tank or basin into the waste water which is to be aerated.

The twin impeller 2' as well as the enclosing guide tube or tubular member 7 are advantageously constructed such that their average or mean specific weight approximately corresponds to that of the waste water to be purified, in order to thereby avoid the need for complicated and expensive bearings and supports.

The infeed lines or conduits 8 are operatively connected with a gas conveying pump 16 which sucks-off the gas mixture containing oxygen out of the space or region 11 located above the liquid or waste water 20 by means of the conduit or line 17 and, when required, this gas conveying pump 16 can be connected via the conduit or line 18 with a source which delivers, for instance, pure oxygen.

The twin impeller 2' is constructed in such a manner that the liquid conveying channels 9 of the upper impeller half 2a are curved upwardly at the region of their respective outlet mouth or opening 9a and the liquid conveying channels 9 of the lower impeller half 2b are downwardly curved at the region of their respective outlet mouth or opening 9a, as best seen by referring to FIG. 6, so that there can be faultlessly realized a desired respective upper and lower substantially torus-shaped circulation flow at the upper and lower halves, respectively, of the aeration tank or basin 1.

Further, it should be readily apparent to those skilled in this particular field of technology, insofar as the various exemplary embodiments of equipment of this development have been illustrated and described, it would be possible to incorporate features of one embodiment into another embodiment while adhering to the basic and underlying concepts of the present invention. Also modifications within the spirit of the invention can be made without departing from the intended scope thereof.

Finally, certain additional observations with respect to the heretofore disclosed embodiments are to be noted. It will be recalled that the liquid departing out of the conveying channels flows at an angle of at least 5° relative to a substantially horizontal plane towards the side of the rotor or impeller provided with the inlet opening or inlet opening means. This angle can be advantageously within a range of 5° to 35°. Moreover, the rim of buckets or blades of the rotor or impeller forms the conveying channels which are curved in substantially vertical planes, the curvature of each channel may be advantageously undertaken such that the liquid entering each such conveying channel is deflected through an angle greater than 90° and exits from the impeller at the periphery or circumference thereof. It is also possible, as previously mentioned, to design the system such that at least a portion of the conveying channels formed between the individual buckets of the impeller are connected via the connection conduits or lines 8 with the gas volume located above the liquid level, with the ambient atmosphere and/or with a source of oxygen or the like. Finally, the flow guiding device or mechanism, viewed in the direction of the axis of rotation of the impeller, can possess a substantially rectangular cross-sectional configuration, or a three-, four-, or multi-arm cross-sectional configuration. Also, the spacing of the outer edges of the flow guiding surfaces from the surrounding tubular member can be in the order of 10% to 50% of one-half of the internal dimension of such tubular member.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for circulating and aerating a liquid, especially waste water located in a basin, comprising a basin containing the liquid, a rotatable centrifugal impeller means immersible into the liquid contained within the basin, said rotatable centrifugal impeller means being rotatable about a substantially vertical axis, said rotatable centrifugal impeller means being provided with at least approximately radially extending liquid conveying channels, said rotatable centrifugal impeller means being provided with inlet opening means for the liquid at one end of the liquid conveying channels and outlet openings at the other end of the liquid conveying channels, means provided for the liquid conveying channels for imparting a direction of flow to the liquid departing out of the liquid conveying channels which is at an angle of at least 5° with respect to a substantially horizontal plane towards the side of the rotor provided with the inlet opening means, a flow guiding device having radially and axially extending flow guide surfaces and extending upwardly from the basin floor to a position adjacent the inlet opening means of the impeller means, the radial extent of the flow guide surfaces being at least equal to approximately the radius of the inlet opening means of the impeller means, infeed means for the introduction of oxygen and activated sludge into a suction region of the inlet opening means of the impeller means, and a tubular member arranged centrally with respect to the rotational axis of the impeller means and surrounding the flow guiding device over a major portion of the length of the flow guiding device for the exact guiding of the waste water into the suction region of the impeller means.

2. The apparatus as defined in claim 1, wherein said flow imparting means provided for the liquid conveying channels comprises each liquid conveying channel being curved at least at the region of its outlet opening in a vertical plane in a manner such as to impart said direction of flow to the liquid departing out of the liquid conveying channels.

3. The apparatus as defined in claim 1, wherein said flow imparting means provided for the liquid conveying channels comprises flow deflection surface means provided at the region of the outlet openings for imparting said direction of flow to the liquid departing out of the liquid conveying channels.

4. The apparatus as defined in claim 1, wherein said rotatable centrifugal impeller means is constructed as a buoyant body.

5. The apparatus as defined in claim 1, wherein said rotatable centrifugal impeller means is constructed in such a manner that the liquid departing from the liquid conveying channels flows out at an angle in a range of approximately 5° to 35° relative to said substantially horizontal plane.

6. The apparatus as defined in claim 1, wherein said impeller means forms a multiplicity of said liquid conveying channels which are curved in vertical planes in such a manner that liquid entering into the conveying channels is deflected in each such channel through an angle greater than 90° and departs out of the impeller means at the periphery thereof.

7. The apparatus as defined in claim 1, wherein at least a portion of the conveying channels formed between individual buckets of the impeller means are selectively connected via connection conduit means with any one of a gas volume located above the liquid level, the ambient atmosphere or a source of oxygen.

8. The apparatus as defined in claim 7, wherein said connection conduit means open into a negative pressure region of the liquid conveying channels.

9. The apparatus as defined in claim 1, wherein said flow guiding device, viewed in the direction of the axis of rotation of the impeller means, possesses a substantially rectangualar cross-sectional configuration.

10. The apparatus as defined in claim 1, wherein said flow guiding device, viewed in the direction of the axis of rotation of the impeller means, possesses a substantially three-arm cross-sectional configuration.

11. The apparatus as defined in claim 1, wherein the flow guiding device, viewed in the direction of the axis of rotation of the impeller means, possesses a four-arm cross-sectional configuration.

12. The apparatus as defined in claim 1, wherein the flow guiding device, viewed in the direction of the axis of rotation of the impeller means, possesses a multi-arm cross-sectional configuration.

13. The apparatus as defined in claim 1, wherein the flow guide surfaces are twisted in a helical-shaped configuration along the axis of rotation of the impeller means.

14. The apparatus as defined in claim 1, wherein the outer edges of the flow guide surfaces are radially spaced from the flow guide tube.

15. The apparatus as defined in claim 14, wherein the radial spacing of the outer edges of the flow guide surfaces from the flow guide tube is about 10% to 50% of the tube inner radius.

16. The apparatus as defined in claim 1, wherein the impeller is constructed as a double-sided centrifugal pump impeller having upper and lower suction openings and including a further flow guide device extending from the water surface to a point adjacent the upper suction opening of the impeller, the further flow guide device having its flow guide surfaces surrounded by a further flow guide tube arranged centrally with respect to the impeller axis.

17. The apparatus as defined in claim 16, wherein the flow guide surfaces of said flow guide devices are turned in a helical line configuration along the lengthwise axis of the impeller such that the waste water to be aerated flows into the upper and lower suction openings of the impeller with a direction of rotation which is opposite to the direction of rotation of the impeller.

* * * * *